United States Patent [19]

Miller

[11] 4,116,321

[45] Sep. 26, 1978

[54] VALVE ARRANGEMENT FOR CLOSED-LOOP CONTROL SYSTEM

[75] Inventor: Alan Leonard Miller, Mount Prospect, Ill.

[73] Assignee: Borg-Warner Corporation, Chicago, Ill.

[21] Appl. No.: 754,382

[22] Filed: Dec. 27, 1976

[51] Int. Cl.² ............... F16D 23/10; F16D 43/06
[52] U.S. Cl. ..................... 192/103 F; 192/104 F; 192/109 F
[58] Field of Search .......... 192/103 R, 103 F, 104 R, 192/104 F, 109 F, 12 D, 18 B

[56] References Cited

U.S. PATENT DOCUMENTS

| | | | |
|---|---|---|---|
| 3,437,188 | 4/1969 | Long | 192/103 F |
| 3,599,764 | 8/1971 | Daab et al. | 192/12 D |
| 3,752,284 | 8/1973 | Brittain et al. | 192/103 F |
| 3,915,271 | 10/1975 | Harper | 192/103 R |
| 4,019,614 | 4/1977 | Prenzel et al. | 192/103 F |
| 4,040,508 | 8/1977 | Sunada et al. | 192/104 R |

*Primary Examiner*—Ronald C. Capossela
*Attorney, Agent, or Firm*—James J. Jennings, Jr.

[57] ABSTRACT

A two-stage, four-way valve has fluid input and output connections, and passes a fluid under controlled pressure to an actuator to operate any component. Such operation is sensed and, after comparison with a reference signal, a control signal regulates the duty cycle of a pulse-width modulation (PWM) circuit. The output square-wave signal from the PWM circuit regulates a solenoid incorporated in the valve, to modify its operation and regulate the pressure of the controlled fluid. The valve has a spool which effectively integrates the PWM signal and provides a type 1 servo system when connected in a closed loop system.

8 Claims, 9 Drawing Figures

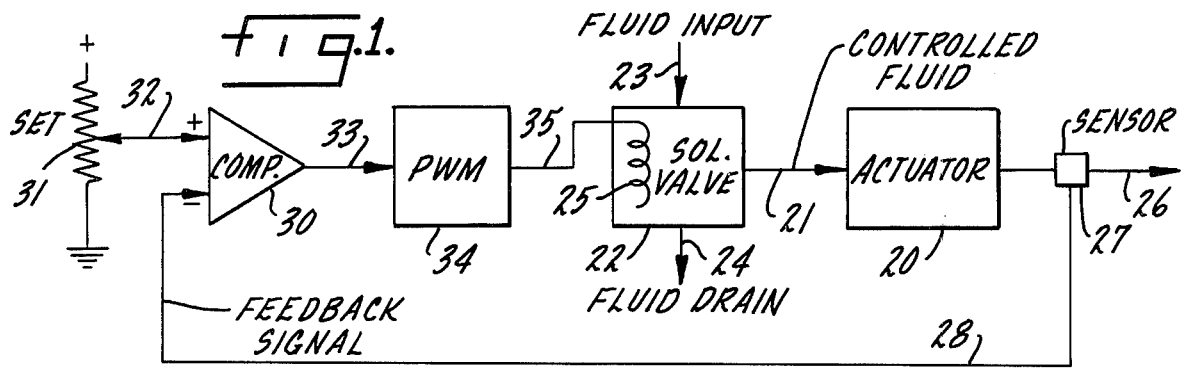
fig.1.
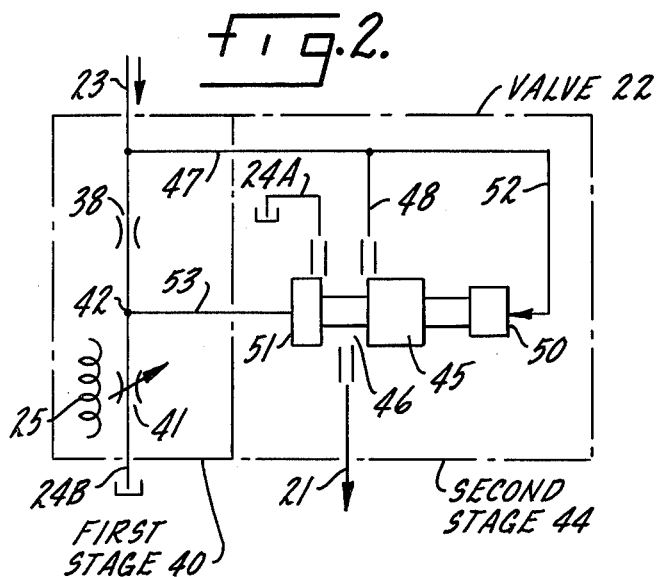
fig.2.
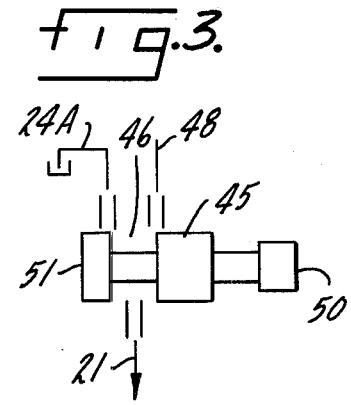
fig.3.
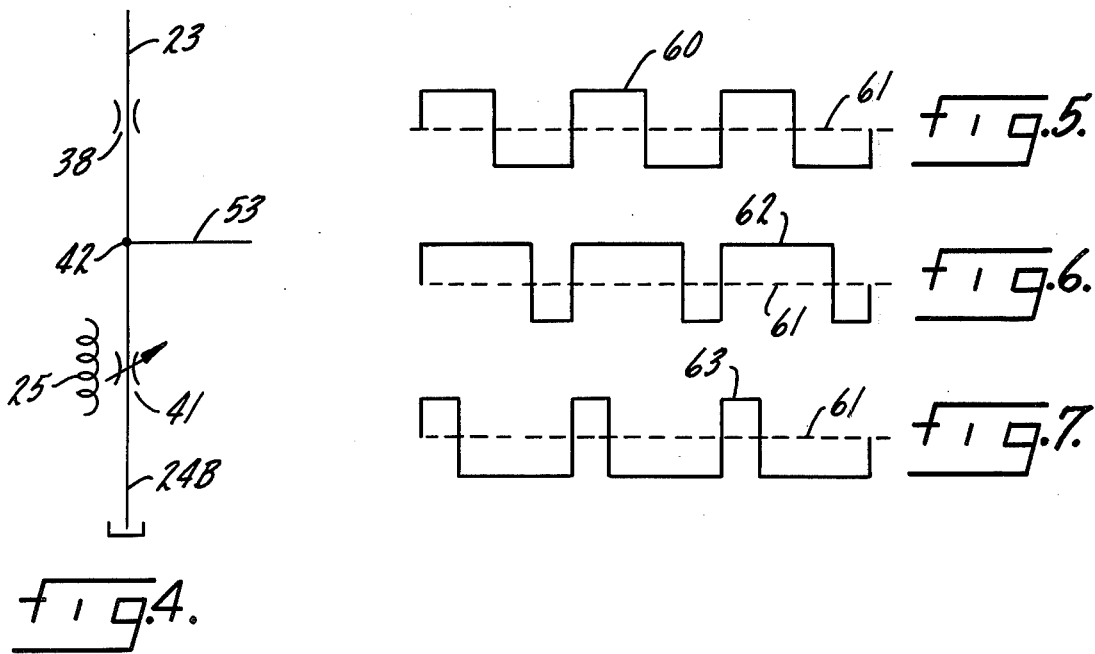
fig.4.
fig.5.
fig.6.
fig.7.

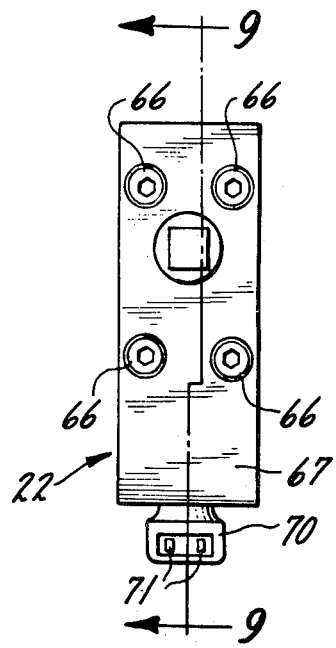
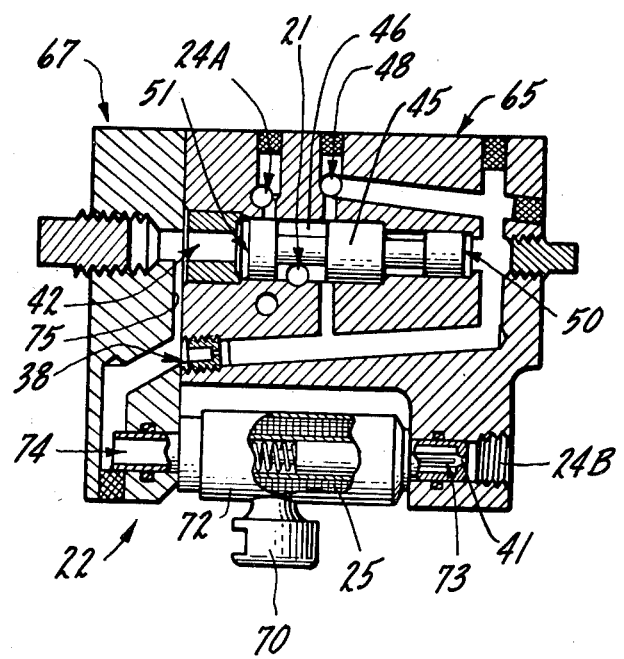

VALVE ARRANGEMENT FOR CLOSED-LOOP CONTROL SYSTEM

BACKGROUND OF THE INVENTION

Various types of valve arrangements have been used where a change in the output control pressure of the fluid is supplied to an actuator, such as a clutch or a brake mechanism in an automatic transmission. Two-stage valves have been used in an effort to amplify the flow capacity as a function of a relatively small change in the input flow signal. In general such arrangements have been spool-type valves, with an orifice in the center portion where the main amplification is provided. Different types of arrangements have been used for the first of the two stages. One known approach includes the use of a servo valve, of the type wherein an electrical input signal provides a displacement of some valve component in a precise manner. However such valves are very expensive, and this militates against their use in automotive applications where cost of each component is a very significant factor.

It is therefore a primary object of the present invention to provide an improved control system for regulating actuators such as those used in the changing of gear ratios in an automatic transmission.

A corollary object is to provide such a control system which provides the advantages of a type 1 servo system but does not require an expensive valve such as a servo valve.

Another important object of the invention is to provide such a control system in which the valve spool has a less critical relationship with the valve body than is normally found in such units.

SUMMARY OF THE INVENTION

This invention includes a control system for operating an actuator to produce an output result as a function of a fluid pressure change supplied over a fluid line to the actuator. The system includes a two-stage, four-way valve of which the input stage has a winding for receiving an electrical signal to produce a pilot operation. The valve output stage is interconnected with the first stage to produce an output change in fluid pressure for application to the actuator. A pulse-width modulation circuit has its output circuit coupled to the valve winding. The PWM circuit provides an alternating output signal of which the duty cycle is varied as a function of an input control signal received at the PWM input circuit. A comparator circuit is connected to provide the control signal for the PWM circuit. The comparator has a first input connection for receiving a reference signal, and a second input connection for receiving a feedback signal. A sensor is physically positioned to provide an electrical signal as a function of changes in the output result produced by the actuator. Some means, such as an electrical conductor, applies the electrical signal as the feedback signal to the second input connection of the comparator circuit.

THE DRAWINGS

In the several figures of the drawings, like reference numerals identify like components, and in those drawings:

FIG. 1 is a block diagram of a control system constructed in accordance with the inventive teaching;

FIG. 2 is a schematic diagram of a valve arrangement useful with the present invention;

FIG. 3 is a simplified illustration of the second stage of the two-stage valve depicted in FIG. 2;

FIG. 4 is a simplified illustration of the first stage of the same valve;

FIGS. 5, 6 and 7 are graphical illustrations, useful in understanding the operation of the valve shown in FIGS. 2-4;

FIG. 8 is an end view, providing structural details of the valve shown in FIGS. 2-4; and FIG. 9 is a sectional view, taken along the line 9—9 of FIG. 8, depicting additional structural details of the valve.

CONTROL SYSTEM ARRANGEMENT

FIG. 1 depicts a control system for regulating the operation of an actuator 20, which can be a clutch or brake mechanism in an automatic transmission, or any unit which responds to the change of a pressure of the controlled fluid in line 21. This fluid pressure is in turn regulated by the valve 22, which is a salient component of this invention. The valve receives fluid under pressure over line 23 from a pump or other supply unit, and the fluid from the valve is drained over line 24 to a sump or common well. This valve also includes a winding 25, which is effective to vary an orifice as will be explained below.

The work or change effected by operation of the actuator 20 is translated over the output line 26. In an automotive environment, this could be the drive-line or prop shaft which transmits torque to the drive wheels. A sensor 27 is shown positioned to sense some condition of shaft 26, and provide a feedback signal on line 28 which is applied to one input connection of a comparator stage 30. The feedback signal can be a speed-indicating signal of the type generally derived and used to indicate vehicle speed or control anti-skid brake arrangements. Alternatively the signal on line 28 can be a torque-indicating signal. A reference or set signal is derived from the reference unit 31, shown as a simple potentiometer which has its arm or movable connection coupled over line 32 to the reference input connection of comparator stage 30. The analogue output from the comparator stage is a d-c control signal which is applied over line 33 to a pulse-width modulation stage 34. This can be a free running multivibrator or voltage-controlled oscillator of the type in which the period is constant but the duty cycle is regulated as a function of the d-c voltage on line 33. Such stages as PWM stage 34 are now well known and understood in this art. The output square-wave signal with a controlled duty cycle is applied over line 35 to winding 25 of valve 22. With this perspective of where the valve 22 is incorporated in the control system, the construction and operation of the valve itself will now be described.

TWO-STAGE VALVE

FIG. 2 is a general representation of the two-stage valve. As there shown a fluid under pressure is received over line 23, and the fluid is discharged to the sump through the lines 24A and 24B. The input fluid under pressure from line 23 is passed through a first fixed orifice 38 in the first stage 40, and through a second, variable orifice 41 to the output line 24B. The effective size of orifice 41 is regulated by the signal received on winding 25. Orifices 38 and 41 are coupled together at a common point or junction 42, and this point represents a constant pressure point in the valve arrangement.

The second stage 44 of the valve includes a spool 45 which, as a function of its position in the valve body (not shown), regulates the fluid flow through a metering orifice 46 in a well known manner. The orifice 46 is depicted in hydraulic format; fluid under pressure received in supply line 23 is passed through the lines 47 and 48 to the input side of the orifice, and some of the fluid is discharged through line 24A to the sump. The remainder is passed from the metering orifice through fluid line 21 to regulate operation of the actuator. The spool also has a first end surface 50 and a second end surface 51. Some fluid under supply pressure is also passed over lines 23, 47 and 52 to the first end surface 50 of the spool. The pressure at common point 42 is applied over line 53 to the other end of spool 45. To appreciate the cooperation between the first and second stages, the two stages will first be considered separately.

FIG. 3 shows the spool 45 itself, with an input pressure being applied through line 48 to one side of the orifice 46, to regulate the pressure in the control line 21. Some of the fluid is continually leaked through the output or discharge of the orifice 46 toward the sump, passing over line 24A. The valve 22 is particularly useful with an automatic transmission, and a constant pressure and a large sump are available therein; thus the constant flow valve lends itself to use in this environment. With a constant pressure from the supply line also applied to the right end 50 of the spool, it is manifest that the lateral position of the spool, and hence the pressure in the control line 21, will be determined by what occurs at the left side of the spool, to balance the pressure applied at the right end of the spool. The second stage uses a metering spool 45, and is a four-way valve with an open center. The second stage is a pressure control stage because it regulates the pressure over line 21, as a function of spool position, to operate a unit such as a clutch in an automatic transmission.

The first stage, represented in FIG. 4, is similar to the second stage only in that it is also an open center arrangement, at common point 42. Because orifice 38 is a fixed orifice, the first stage is a three-way arrangement. Instead of a spool, the first stage uses a combination of fixed orifice 38 and the variable orifice 41 to effect the desired control. However in the first stage it is flow, rather than the pressure, which is controlled.

Because orifice 38 is fixed, the common point 42 "sees" or is subjected to a pressure substantially that in the supply line 23, neglecting the friction drops and other minor losses. Hence the variation in the size of orifice 41 changes the flow through the orifice, so that an average of the variable flow will be applied over the line 53 to the second end surface 51 of the spool.

Considering the first and second stages of valve 22 together, as shown in FIG. 2, when the system has zero error, the duty cycle of the PWM signal is 50%, there is no net flow in line 53, and spool 45 is at rest; under these conditions there is a constant pressure in the control line 21. This control line pressure can be changed, as a result of a change in the feedback signal returned over line 28 and/or a change in the reference signal established by potentiometer 31; both these signals are applied to the comparator stage. Any change which produces a different value of the analogue control signal on line 33 results in a change in the duty cycle of the PWM signal applied over line 35 to winding 25 in the first stage of the control valve. This changes the effective opening of orifice 41 very rapidly and provides a different average flow rate through the variable orifice 41. This in turn effects a different net flow in the line 53, and a different reaction against the spool end 51 to counter the thrust applied to the other end 50 by the pressure in the supply line. This produces spool movement and displaces the actuator, in turn altering the feedback signal in a direction to reduce the error signal toward zero.

It is noted that the spool will thus achieve a balance position irrespective of whether the change in the system occured in the output line 26 and was detected by the sensor 27, or whether the change was initiated by an adjustment of the set potentiometer 31. The valve 22 responds to the duty cycle of the alternating signal provided by the PWM circuit 34 and applied to the solenoid winding 25. As noted previously, this signal has a constant time period (or frequency) and a variable duty cycle. When the system is balanced, the alternating signal has a 50% duty cycle, as represented by the waveform 60 in FIG. 5. That portion of the waveform above the broken line 61 represents the energization time of the solenoid winding. The system is designed so that with a 50% duty cycle of the modulating signal, the effective size of the variable orifice 41 will be equal to the size of the first orifice 38. To reduce the effective orifice size, the duty cycle can be increased above 50%. FIG. 6 shows a 75% duty cycle represented by the waveform 62. With this condition the flow rate is changed at the common point 42, with a consequent change in the reaction against the second end surface 51 of spool 45. Reducing the duty cycle to 25%, as depicted by waveform 63 in FIG. 7, effectively enlarges the size of variable orifice 41 and changes the reaction against the spool in the opposite sense. It is noted that the spool is actually displaced laterally with each energization of the solenoid winding 25. However the average orifice size, and hence the average flow rate at the left end of the spool, is controlled by the duty cycle of the alternating signal on line 35. This means the invention can be implemented with a simple and economical solenoid valve in the first stage of the two-stage control valve, rather than the much more expensive servo-type valve such as are generally used for this purpose.

Details of this valve 22 shown generally in FIGS. 2–4 are set out in FIGS. 8 and 9. The end view of valve 22 shown in FIG. 8 illustrates the valve body cover 67 which is secured with four screws 66 to the valve body 65. FIG. 8 also depicts a depending plug body 70 with a pair of electrical contacts 71 for receiving the conductors carrying the output signal from PWM circuit 34, for application to the solenoid winding 25. This winding is better shown in FIG. 9, within the solenoid body 72. The PWM signal applied to winding 25 determines the position of plunger 73, and thus regulates the effective opening of the variable orifice 41.

Considering the flow, the fluid under pressure is admitted through the opening 48 shown near the top center of FIG. 9, and flows to the right and then downwardly past the first end surface 50 of the spool 45. This establishes a certain pressure at this end of the spool. The fluid continues downwardly and then to the left, through the fixed orifice 38 in the first stage of the valve. After passing through this fixed orifice, the major portion of the fluid continues downwardly and then to the right through inlet line 74, through the interior channel of the solenoid, and through the variable orifice 41. The fluid passing through this orifice is then returned through the discharge port 24B to the sump.

In the first stage, after passing through the fixed orifice 38, some of the fluid passes upwardly through channel 75 to the common point or chamber 42, so that this flow establishes a reaction force against the second end surface 51 of the second stage spool. Those skilled in the art will understand that rapid movement of the solenoid plunger 73 in effect establishes an average position, and thus an average or effective size of the variable orifice 41.

TECHNICAL ADVANTAGES

The regulation of the average size of variable orifice 41 as just described allows an economical, relatively simple servo valve to be incorporated as the first stage of the two-stage control valve 22. In the second stage of the valve, use of the spool 45 affords an integrating function for the oscillations which occur in the alternating signal applied to winding 25. Use of the spool and the hydraulic system effectively filters out the pulsing action of the solenoid valve. The spool always seeks the proper balance position, to establish system adjustment without any error. This provides a true type 1 servo operation, with the free spool acting as the pure integrator. A type 1 system provides a zero error for a constant input signal, and a constant error for a ramp type input signal. In addition the relationship of the spool to the valve body is less critical than that of the more expensive fluid control valves normally used in such an environment.

While only a particular embodiment of the invention has been described and claimed herein, it is apparent that various modifications and alterations of the invention may be made. It is therefore the intention of the appended claims to cover all such mofifications and alterations as may fall within the true spirit and scope of the invention.

What is claimed is:

1. A control system for changing the pressure of a fluid to operate an actuator as a function of an analogue control signal, comprising:
    a two-stage, four-way control valve in which the second stage is a power stage for producing the pressure change in the fluid in response to actuation of the first stage, and the first stage is a pilot stage which includes a solenoid valve with a winding connected to translate a signal to the second stage as a function of the signal received by the solenoid winding;
    a pulse-width modulation stage, connected to receive the analogue control signal and to provide an output alternating signal the duty cycle of which is a function of the analogue signal, which alternating signal is applied to the solenoid winding in the first stage to effect the control valve operation; and
    means for sensing the actuator operation, comparing the actuator operation to a desired operation, and providing said analogue control signal as a function of such comparison.

2. A control system as claimed in claim 1, in which the valve second stage is a pressure control stage including a spool with a metering orifice and first and second ends, with means for applying a constant pressure to the first end of the spool, and the first stage is a flow control stage with a fixed orifice coupled to a variable orifice at a common point, the average opening of the variable orifice being regulated as a function of the duty cycle of the alternating signal passed from the pulse-width modulation stage to the solenoid winding, and means coupling the common point to the second end of the spool in the second stage, thus applying to the spool a reaction which varies as the flow rate at said common point.

3. A control system for operating an actuator to produce an output result as a function of a fluid pressure change supplied over a fluid line to the actuator, comprising:
    a two-stage, four-way, valve comprising an input stage having a winding for receiving an electrical signal to produce a pilot operation, and an output stage interconnected with the input stage to produce an output change in fluid pressure for application to the actuator;
    a pulse-width modulation circuit, having an output circuit coupled to the winding of the valve for providing an alternating output signal of which the duty cycle is varied as a function of an input control signal received at an input connection of the pulse-width modulation circuit;
    a comparator circuit connected to provide said control signal, having a first input connection for receiving a reference signal and a second input connection for receiving a feedback signal;
    a sensor, physically positioned to provide an electrical signal as a function of changes in the output result produced by the actuator; and
    means for applying said electrical signal as the feedback signal to the second input connection of the comparator circuit.

4. A control system as claimed in claim 3, in which the valve output stage is a pressure control stage including a spool with a metering orifice and first and second end surfaces, with means for applying a constant pressure to the first end surface of the spool, and the input stage is a flow control stage with a fixed orifice coupled to a variable orifice at a common point, the average opening of the variable orifice being regulated as a function of the duty cycle of the alternating signal passed from the pulse-width modulation stage to the solenoid winding, and means coupling the common point to the second end surface of the spool in the output stage, thus applying to the spool a reaction which varies as the flow rate at said common point.

5. A control system for effecting a physical change as a function of an analogue control signal, comprising:
    a two-stage, four-way control valve in which the second stage is a power stage for producing the physical change in response to actuation of the first stage, and the first stage is a pilot stage which includes a solenoid valve with a winding connected to translate a signal to the second stage as a function of the signal received by the solenoid winding;
    a pulse-width modulation stage, connected to receive the analogue control signal and to provide an output alternating signal the duty cycle of which is a function of the analogue signal, which alternating signal is applied to the solenoid winding in the first stage to effect the control valve operation; and
    means for sensing the extent of the physical change, comparing the actual change to a desired physical change, and providing said analogue control signal as a function of such comparison.

6. A control system as claimed in claim 5, in which the valve second stage is a pressure control stage including a spool with a metering orifice and first and second ends, with means for applying a constant pressure to the first end of the spool, and the first stage is a flow control stage with a fixed orifice coupled to a variable orifice at a common point, the average opening of the variable orifice being regulated as a function of the duty cycle of the alternating signal passed from the pulse-width modulation stage to the solenoid winding, and means coupling the common point to the second end of the spool in the second stage, thus applying to the spool a reaction which varies as the flow rate at said common point.

7. A control system for effecting a physical change to produce an output result as a function of a fluid pressure change supplied over a fluid line, comprising:

a two-stage, four-way valve comprising an input stage having a winding for receiving an electrical signal to produce a pilot operation, and an output stage interconnected with the input stage to produce an output change in fluid pressure which effects a physical change;

a pulse-width modulation circuit, having an output circuit coupled to the winding of the valve for providing an alternating output signal of which the duty cycle is varied as a function of an input control signal received at an input connection of the pulse-width modulation circuit;

a comparator circuit, connected to provide said control signal, having a first input connection for receiving a reference signal and a second input connection for receiving a feedback signal;

a sensor, physically positioned to provide an electrical signal as a function of the physical change produced by the fluid pressure change; and means for applying said electrical signal as the feedback signal to the second input connection of the comparator circuit.

8. A control system as claimed in claim 7, in which the valve output stage is a pressure control stage including a spool with a metering orifice and first and second end surfaces, with means for applying a constant pressure to the first end surface of the spool, and the input stage is a flow control stage with a fixed orifice coupled to a variable orifice at a common point, the average opening of the variable orifice being regulated as a function of the duty cycle of the alternating signal passed from the pulse-width modulation stage to the solenoid winding, and means coupling the common point to the second end surface of the spool in the output stage, thus applying to the spool a reaction which varies as the flow rate at said common point.

* * * * *